United States Patent [19]
Johnstone et al.

[11] Patent Number: 4,527,661
[45] Date of Patent: Jul. 9, 1985

[54] ADAPTIVE CONTROL SYSTEM FOR MACHINE TOOL OR THE LIKE

[75] Inventors: Richard Johnstone; Edward E. Kirkham, both of Brookfield, Wis.

[73] Assignee: Kearney & Trecker Corporation, Milwaukee, Wis.

[21] Appl. No.: 316,059

[22] Filed: Oct. 29, 1981

[51] Int. Cl.$^3$ .................. F01M 9/00; F01M 11/10; G06F 15/46
[52] U.S. Cl. ................. 184/6.1; 184/6.4; 184/6.26; 384/468
[58] Field of Search ........... 184/1 C, 6, 6.26, 6.1–6.4; 340/680, 682; 374/170, 183, 185; 384/318; 364/557; 308/5 R, 187

[56] References Cited

U.S. PATENT DOCUMENTS

| | | | |
|---|---|---|---|
| 3,027,625 | 4/1962 | Milstead | 29/106 |
| 3,062,104 | 11/1962 | Deflandre | 90/11 |
| 3,066,578 | 12/1962 | Olton | 90/11 |
| 3,071,207 | 1/1963 | Lewis et al. | 184/6.4 X |
| 3,487,467 | 12/1969 | Gruber | 184/6.4 |
| 3,555,962 | 1/1971 | Wolf et al. | 90/11 |
| 3,579,073 | 5/1971 | Johnstone et al. | 318/634 |
| 3,625,308 | 12/1971 | Gebel | 184/6.4 X |
| 3,674,112 | 7/1972 | Roberts | 184/6.4 X |
| 3,716,280 | 2/1973 | Leibensperger et al. | 303/207 A |
| 4,122,720 | 10/1978 | Podl | 374/170 X |
| 4,133,484 | 1/1979 | Jannone | 239/214.25 |
| 4,198,676 | 4/1980 | Varnum et al. | 364/557 |
| 4,205,708 | 6/1980 | Burgbacher | 184/6.26 X |
| 4,272,216 | 6/1981 | Osburn | 184/6.14 X |
| 4,284,174 | 8/1981 | Salvana et al. | 184/6.4 |
| 4,312,424 | 1/1982 | Taylor et al. | 184/6.4 |
| 4,326,603 | 4/1982 | Darrow | 184/6.1 |
| 4,391,620 | 7/1983 | Geisel | 184/6.26 X |
| 4,403,296 | 7/1983 | Prosky | 364/557 X |
| 4,445,168 | 4/1984 | Petryszyn | 184/6.1 X |

FOREIGN PATENT DOCUMENTS

| | | | |
|---|---|---|---|
| 2222279 | 11/1973 | Fed. Rep. of Germany . | |
| 2229990 | 1/1974 | Fed. Rep. of Germany | 184/1 C |
| 2403702 | 8/1974 | Fed. Rep. of Germany | 184/6.4 |
| 2239150 | 2/1975 | France . | |
| 65495 | 4/1982 | Japan | 184/6.4 |
| 1493284 | 11/1977 | United Kingdom . | |
| 2081820 | 2/1982 | United Kingdom | 184/6.4 |

Primary Examiner—David H. Brown
Assistant Examiner—John E. Griffiths, Jr.
Attorney, Agent, or Firm—Quarles & Brady

[57] ABSTRACT

An adaptive control system for a machine tool or the like includes a temperature sensor for measuring spindle bearing temperature and two pairs of thrust sensors for measuring radial and axial spindle deflection. Data processing apparatus, typically comprised of a microcomputer, is coupled to the temperature and thrust sensors and regulates the percentage of oil in the oil-air mixture lubrication mist sprayed on bearing contact surfaces in accordance with bearing temperature. The microcomputer simultaneously regulates the spindle bearing preload and spindle axis feedrate in accordance with radial and axial spindle thrust, thereby assuring optimum machine tool performance.

2 Claims, 6 Drawing Figures

FIG. 1
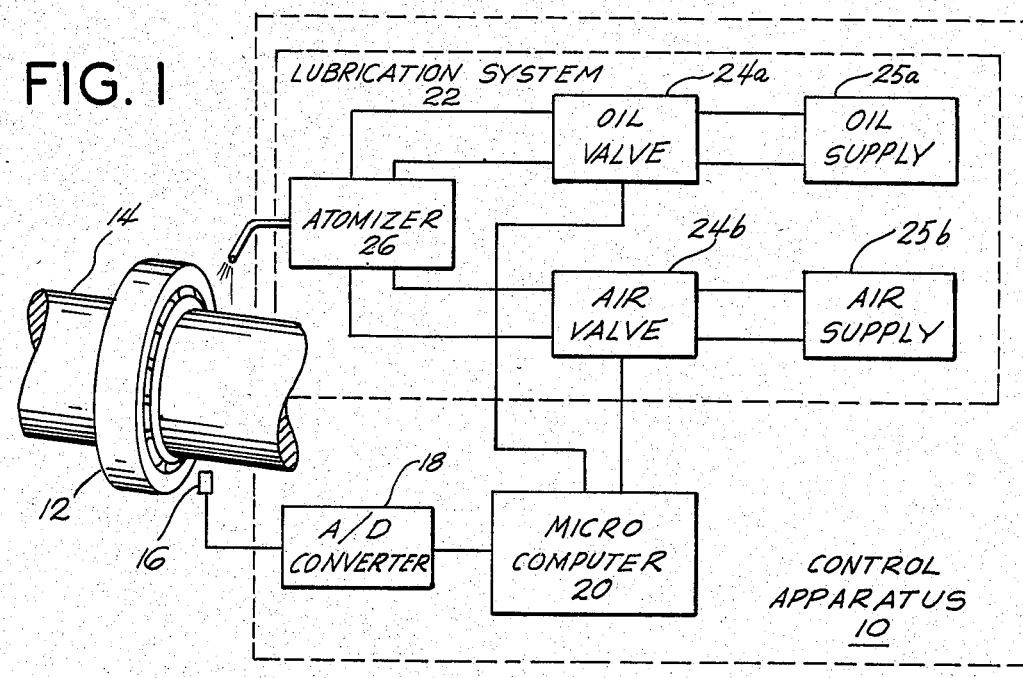
FIG. 1A
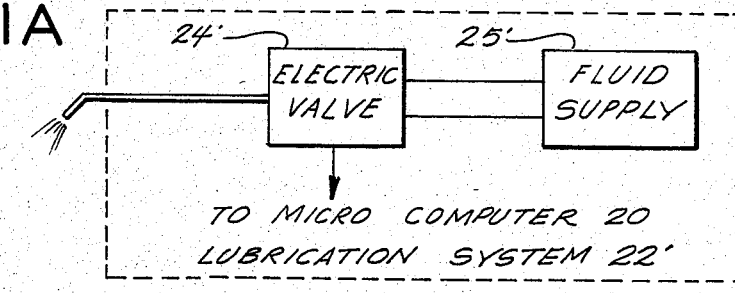
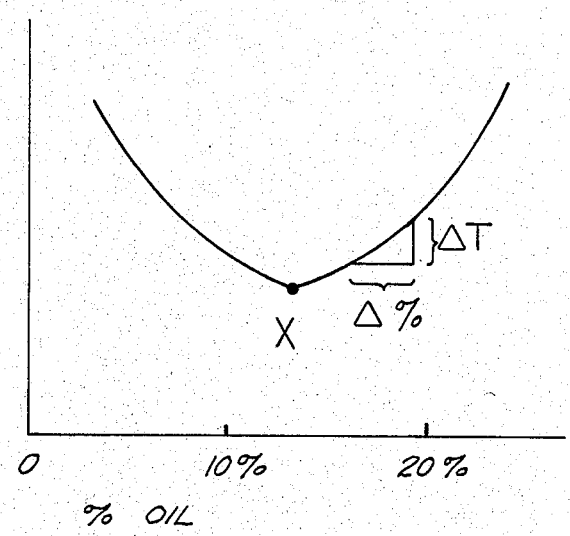
FIG. 2

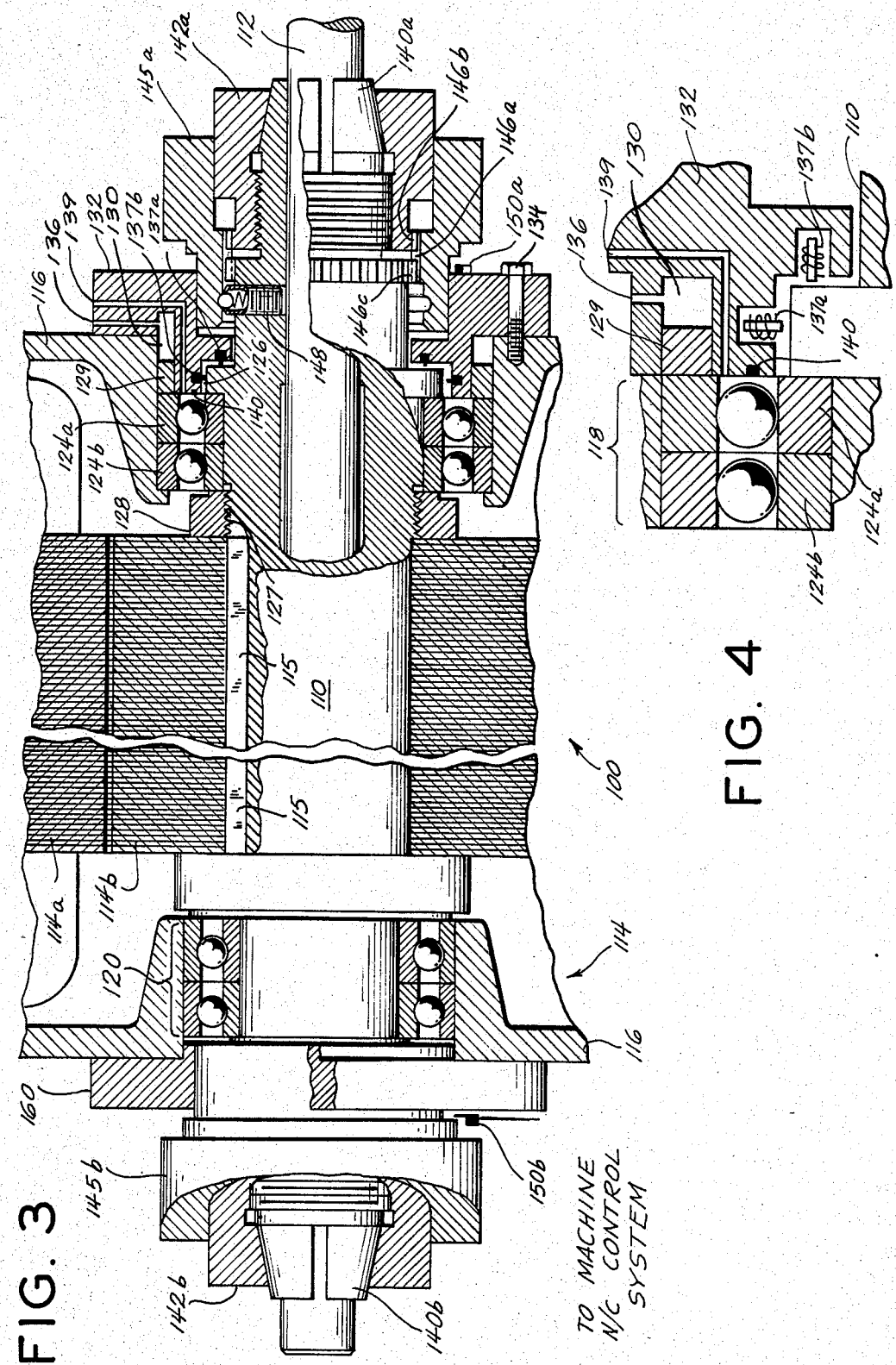

ADAPTIVE CONTROL SYSTEM FOR MACHINE TOOL OR THE LIKE

BACKGROUND OF THE INVENTION

The present invention concerns a control system for machine tools or the like, and more particularly to a control system for machine tools which regulate spindle bearing lubrication in accordance with bearing temperature and which regulates the spindle bearing preload and the spindle axis feedrate in accordance with spindle bearing thrust to assure optimum machine tool performance.

Rotating machinery, such as machine tools, or the like, usually include one or more ball bearings or roller bearings for journaling a rotating member such as a spindle as in the case of a machine tool, to a stationary member such as the machine tool spindlehead. It is well known to those skilled in the art that friction between ball bearing and roller bearing contact surfaces is best reduced by lubricating the bearing with a fluid lubricant, either a single fluid, such as oil or air or a lubricating fluid mixture such as an oil-air mist mixture. An oil-air lubricating mist mixture is particularly advantageous since the air in the oil-air lubrication mist mixture serves to carry away bearing heat while the oil provides appropriate lubrication for bearing contact surfaces, thereby assuring long bearing life.

One of the difficulties incurred in employing an oil-air mist mixture to lubricate ball bearings and roller bearing has been regulation of the amount or volume of oil in the oil-air lubrication mist mixture as percentage of total mixture volume. Too little oil in the oil-air lubrication mist mixture results in insufficient bearing lubrication and hence premature bearing wear. On the other hand, too much oil in the lubrication mist mixture may cause the bearings to clog and overheat thereby greatly reducing bearing life.

Heretofore, regulation of the percentage volume of oil in an oil-air bearing lubrication mist mixture has been achieved by open loop regulation, that is, by manually presetting the oil and air mixing valves. Needless to say, should the speed or axial thrust of the rotating member journaled to the bearing suddenly change, then the percentage volume of oil in the oil-air bearing lubrication mist mixture must also be changed. Otherwise, bearing damage may result if too little or too much oil is present in the bearing lubrication mist mixture. Additionally, should a valve clog, or if the flow of oil becomes intermittent, then there may also be an insufficient volume of oil in the oil-air mist mixture. The present invention concerns a control apparatus for rotating machinery which automatically regulates the percentage volume of oil in the oil-air lubrication mist mixture supplied to lubricate rotating machinery ball and roller bearings.

It is an object of the present invention to provide a control apparatus for regulating the lubrication provided to rotating machinery bearings.

It is another object of the present invention to provide a control apparatus for automatically regulating the lubrication provided to machinery bearings in accordance with bearing temperature to assure reduced bearing temperature thereby extending bearing life.

It is yet another object of the present invention to provide a machine tool control apparatus for automatically regulating spindle bearing lubrication in accordance with spindle bearing temperature and for regulating the spindle bearing preload and the spindle axis feedrate in accordance with radial and axial spindle deflection.

BRIEF SUMMARY OF THE INVENTION

Briefly, in accordance with the invention, a control apparatus for regulating the lubrication provided to rotating machinery roller and ball bearings comprises a lubrication system for providing the machinery bearings with fluid lubrication which may either be an oil-air mist mixture or a single fluid such as air or oil. A temperature sensor, such as a thermistor or thermistor network, senses bearing temperature and provides an electrical signal indicative thereof to a control apparatus, such as a microcomputer. In accordance with bearing temperature, the microcomputer automatically regulates the volume of fluid lubrication supplied to the bearings from the lubrication system, thereby assuring proper bearing lubrication at all times.

A preferred embodiment of the invention, specifically adapted for use with a machine tool such as a horizontal or vertical boring mill, further includes thrust sensors for sensing radial and axial spindle thrust and for generating an electrical signal indicative thereof. The control apparatus, in addition to regulating the volume of spindle bearing lubrication in accordance with bearing temperature also regulates spindle bearing preload and the spindle axis feedrate in accordance with radial and axial spindle thrust to reduce bearing stress, thereby assuring optimum machine tool performance.

BRIEF SUMMARY OF THE DRAWINGS

The features of the invention believed to be novel are set forth with particularity in the appended claims. The invention itself, however, both as to organization and the method of operation, together with further objects and advantages thereof, may best be understood by reference to the following description taken in conjunction with the accompanying drawings in which:

FIG. 1 is a block diagram of the control apparatus of the present invention;

FIG. 1A is an alternate embodiment of the lubrication system of FIG. 1;

FIG. 2 is a graphical representation of how bearing temperature varies in accordance with the percentage volume of oil in the oil-air mist lubrication mixture;

FIG. 3 is a side elevational view of a high speed machine tool spindle of a machine tool;

FIG. 4 is an enlarged view of a portion of the high speed spindle illustrated in FIG. 3.

DETAILED DESCRIPTION OF THE PREFERRED EMBODIMENT

Figure 5:
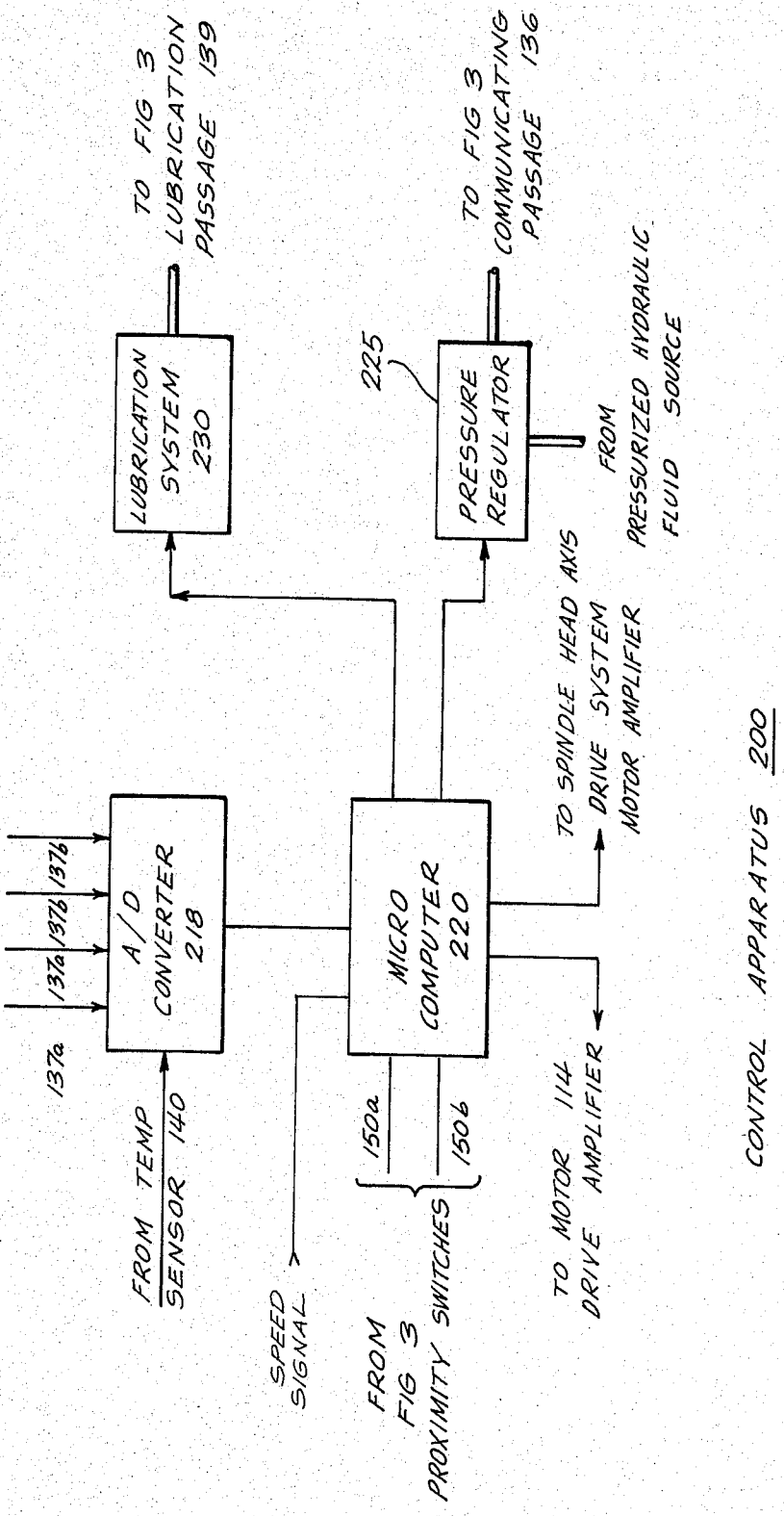
FIG. 5 is a block diagram of a modification of the control apparatus of FIG. 1 for controlling a machine tool embodying the spindle of FIGS. 3 and 4.

FIG. 1 illustrates a block diagram of a control apparatus 10 for rotating machinery, such as a machine tool, for regulating the lubrication supplied to machinery bearings 12 which journal a rotating machinery member such as a shaft 14 to a stationary member (not shown). Control apparatus 10 comprises a temperature sensor 16, typically configured of a thermistor or the like, mounted adjacent to bearing 12 for providing an electrical output signal indicative of bearing temperature. In certain instances, it may be desirable to employ a pair of thermistors to measure the temperature of the fluid (either air or oil, for example) entering and exiting the bearing for determining bearing temperature exactly. The output signal of thermistor 16 is supplied to an analog to digital (A/D) converter 18 which converts the analog thermistor output signal into a digital signal which is supplied to an electronic processing circuit 20, typically a microcomputer. Microcomputer 20 is responsive to the output signal of A/D converter 18, and in accordance therewith, determines the proper volume of lubrication fluid supplied by lubrication apparatus 22 to lubricate bearing 12.

In the presently preferred embodiment, lubrication system 22 is configured to provide an oil-air lubrication mist mixture and includes a pair of electrically controlled valves 24a and 24b, each valve being electrically connected to and controlled by microcomputer 20. Valve 24b is coupled between a supply of pressurized air 25b and an atomizer 26 and controls the amount or volume of air admitted to atomizer 26 in accordance with signals from microcomputer 20. Valve 24a is coupled between a supply of pressurized lubricating oil 25a and atomizer 26 and controls the volume of oil admitted to the atomizer in accordance with signals from microcomputer 20. Typically, each of valves 24a and 24b comprises an ASCO model TX8262208 valve manufactured by Automatic Switch Company, Florheim Park, N.J. Atomizer 26 atomizes the oil supplied thereto from oil supply 25a through valve 24a with air supplied thereto from air supply 25b through valve 24b to produce the oil-air mist mixture which is sprayed on bearing 12.

A better understanding of how microcomputer 20 regulates the percentage volume of oil in the oil-air lubrication mist mixture may be gained by reference to FIG. 2 which illustrates the relationship between the percentage volume of oil in the oil-air lubrication mist mixture and the bearing temperature. As can be seen, the relationship between the percentage volume of oil in the lubrication mist mixture and the bearing temperature is concave upwards, having a relative minimum identified by the point X. With the knowledge that the relationship between the percentage volume of oil in the lubrication mist mixture and the bearing temperature is concave upwards, microcomputer 20 is programmed to calculate the ratio of the rate of change of bearing temperature to the rate of change of the percentage volume of oil in the lubrication mist mixture ($\Delta T/\Delta\%$). If $\Delta T$ is made sufficiently small, then $dT/d\%$, the first derivative of the bearing temperature-% oil relationship can be approximated. Since, from elementary calculus, the first derivative ($dT/d\%$) of the bearing temperature-% oil relationship is representative of the slope of the curve, and since the slope of the bearing temperature-% oil curve of FIG. 2 is equal to zero at the point X on the curve, it follows that $dT/d\%$ is zero at the relative minimum (point X) on the curve of FIG. 2. From the calculated values of $dT/d\%$, microcomputer 20 can determine the percentage volume of oil necessary to maintain minimum bearing temperature.

The process by which microcomputer 20 regulates the % volume of oil in the oil-air bearing lubrication mist mixture is a dynamic rather than a static process. Since bearing temperature does not remain constant, but varies in accordance with such factors as shaft speed and bearing load, among others, microcomputer 20 continually monitors bearing temperatures so that the % volume of oil can be continuously regulated to assure proper bearing lubrication. Microcomputer 20's fast processing speed allows it to respond to very rapid incremented changes in bearing temperature, thereby assuring proper bearing lubrication at all times.

It may be desirable in some applications to lubricate the rotating machinery bearings with a single lubricating fluid such as oil or air in contrast to lubricating the bearings with a mixture of lubricating fluids such as air and oil. This may be readily accomplished by employing the alternate lubrication system embodiment 22' illustrated in FIG. 1A in place of lubrication system 22 in FIG. 1. Lubrication system 22' comprises a single electrically controlled valve 24' which is coupled to a supply of pressurized lubrication fluid 25' (which fluid may be either a gas, such as air or a liquid such as oil) for regulating the volume lubricating fluid supplied to bearing 12 (FIG. 1) in accordance with signals from microcomputer 20 (FIG. 1). The volume of lubrication fluid carried by valve 24' from lubricating fluid supply 25' is controlled by microcomputer 20 in accordance with bearing temperature in exactly the same manner in which microcomputer 20 controls valves 24a and 24b of lubrication system 22 of FIG. 1, since the bearing temperature will vary in accordance with the volume of fluid supplied from lubrication supply 25' in exactly the same way the bearing temperature varies in accordance with the percentage volume of oil as depicted in FIG. 2.

The control apparatus of FIG. 1 is well suited for use with numerically controlled machine tools for automatically regulating spindle bearing lubrication. The control apparatus allows higher machine tool spindle speeds and higher spindle loads to be reached than would otherwise be possible. Further, as detailed hereinafter, the control apparatus described above, can be modified to control not only machine tool spindle bearing lubrication but the spindle bearing preload and the spindle axis feedrate which allows attainment of still higher spindle speeds and spindle loads as well. This may be better understood by reference to FIGS. 3 and 4 which illustrate a portion of a high speed spindle assembly 100 of a numerically controlled machine tool. Spindle assembly 100 is typically disposed in a frame such as the machine tool spindlehead, (not shown) which is linearly movable on the machine tool along an axis at a rate referred to as the spindle axis feedrate. Although spindle assembly 100 can take the form of any well known high speed spindle, in the presently illustrated embodiment, spindle assembly 100 comprises the high speed spindle assembly described in U.S. Pat. No. 4,421,443 issued to Woythal et al on Dec. 20, 1983. The aforementioned patent is herein incorporated by reference. As described in that patent, high speed spindle assembly 100 comprises a spindle 110 having an axially extending bore therethrough dimensioned to receive the shank 112 of a cutting tool therein. Spindle 110 is integral with the shaft of a motor 114 comprised of a stator 114a and a rotor 114b. A key 115 extending from spindle 110 engages a complementary keyway in the rotor (not shown) to lock the spindle to the rotor so that spindle 110 rotates co-jointly with rotor 114b.

Spindle 110 extends through the case 116 of motor 114 and is journaled to the front and rear of motor case 116 by front and rear spindle bearings 118 and 120, respectively, which are each carried on spindle 110 adjacent to a separate one of the ends thereof. Front spindle bearing 118 comprises a pair of ball bearings 124a and 124b, respectively, which are carried on spindle 110 between a shoulder or flange 126 and threads 127. A nut 128 engages threads 127 to urge the lower races of ball bearings 124a and 124b against shoulder 126. Adjusting the displacement of nut 128 from shoulder 126 serves to vary the force against, or the preloading on, the lower ball bearing races. The upper races of ball bearings 124a and 124b are urged against a vertical wall in motor case 116 by an annular ring piston 129 which is reciprocally disposed in a piston chamber 130 within a front bearing cap 132 fastened to motor case 116 by bolts 134 which are disposed through passages spaced equidistantly about the bearing cap circumference.

The amount of force or preloading on the upper races of ball bearings 124a and 124b varies in accordance with the pressure of hydraulic fluid admitted into piston chamber 130 through a connecting passage 136 from a source of hydraulic fluid (not shown) which is coupled to connecting passage 136 through a pressure regulator (described hereinafter). The pressure of hydraulic fluid admitted through connecting passage 136 from the source of hydraulic fluid is varied by the pressure regulator in accordance with radial and axial spindle bearing thrust. To this end, two pairs of spindle thrust sensors 137a and 137b, respectively, whose sensors are typically comprised of a magnetic or capacitive transducer, are disposed within bearing cap 132 adjacent to spindle shoulder 126 to measure radial and axial spindle thrust, respectively. Referring now to FIG. 4 which is an enlarged fragmentary view of a portion of the spindle assembly illustrated in FIG. 3, to measure radial spindle thrust, one thrust sensor of thrust sensor pair 137a is vertically disposed in bearing cap 132 adjacent to flange 126 above the axis of spindle 110; the other thrust sensor (not shown) of thrust sensor pair 137a is vertically disposed in bearing cap 132 so as to be adjacent to flange 126 below the spindle axis. To measure axial bearing thrust, one thrust sensor of thrust sensor pair 137b is horizontally mounted in bearing cap 132 adjacent to the flange so as to be above the spindle axis while the other thrust sensor (not shown) of thrust sensor pair 137b is horizontally mounted in the bearing cap adjacent to flange 126 below spindle axis 138. The thrust sensors of thrust sensor pairs 137a and 137b are connected differentially to produce a signal varying in accordance with radial and axial spindle thrust, respectively.

The output signal produced by each of thrust sensor pairs 137a and 137b, which varies in accordance with radial and axial spindle thrust, respectively, is supplied to a control apparatus 200 illustrated in FIG. 5 which controls the spindle axis rate and bearing preload as well as the percentage volume of oil in the oil-air lubrication mist mixture. Control apparatus 200 comprises an analog to digital (A/D) converter 218, for converting the analog signal from each of thrust sensor pairs 137a and 137b (FIGS. 3 and 4) into a digital signal which is transmitted to a microcomputer 220. Microcomputer 220 is responsive to the output signals from A/D converter 218 and, during intervals when the radial and axial thrusts on spindle 110 (FIG. 3) are large, as will likely occur when spindle speeds are low and the force on the cutting tool is large, microcomputer 220 modulates the output signal supplied to a pressure regulator 225, coupled between the source of pressurized hydraulic fluid and passage 136, (FIG. 3) to increase the pressure of hydraulic fluid admitted through connecting passage 136 to piston chamber 130 (FIG. 3) so as to increase the force of piston 130 against the upper races of bearings 124a and 124b (FIG. 3), accordingly, thereby increasing bearing preload to reduce bearing chatter. It addition, during intervals of large radial and axial spindle thrusts, microcomputer 220 also supplies an output signal to the spindlehead axis drive motor amplifier (not shown) to reduce the axis feedrate accordingly. At high spindle speeds when the force on the cutting tool held in spindle 110 (FIG. 3) is likely to be much lower, thereby resulting in lower radial and axial thrusts on spindle 110 (FIG. 3) microcomputer 220, in response commands pressure regulator 225 to reduce the pressure of fluid admitted into piston chamber 130 through connecting passage 136, thereby reducing the preload on bearing 124a and 124b (FIGS. 3 and 4). During this same interval of lower radial and axial spindle bearing thrusts, microcomputer 220 also supplies an output signal to the spindlehead axis drive system motor amplifier to command an increase in the spindle feedrate accordingly. In this way, microcomputer 220 dynamically regulates the preloading on spindle bearings 124a and 124b.

In addition to being responsive to radial and axial spindle thrust, microcomputer 220 is also responsive to machine tool spindle speed, as sensed by a tachometer, or as determined by the machine tool control system. During intervals when machine tool spindle speed is increased, it may be desirable to decrease bearing preload. This is readily accomplished by microcomputer 220 in responsive to an increase in magnitude of the speed signal supplied thereto. Conversely, when spindle speed decreases, microcomputer 220 increases the volume of fluid admitted by the pressure regulated into piston chamber 130 (FIG. 4) through connecting passage 136 (FIG. 4) to increase bearing preload.

Referring back to FIGS. 3 and 4 jointly, a lubrication passage 139 is disposed through bearing cap 132 to carry an oil-air lubrication mist mixture to bearings 124a and 124b from a lubrication system 230 illustrated in FIG. 5, which is configured identically to lubrication system 22 described previously with respect to FIG. 1. A temperature sensor 140 (best illustrated in FIG. 4) is disposed in bearing cap 132 adjacent to bearing 124a and supplies A/D converter 218 illustrated in FIG. 5 with a signal varying in accordance with bearing temperature. In accordance with the digital output signal from A/D converter 218, microcomputer 220 (FIG. 5) while regulating bearing preload and the spindle axis feedrate, also supplies a pair of control signals to lubrication system 230 to regulate the percentage volume of oil in the oil-air mist mixture supplied through lubrication passage 139 to bearings 124a and 124b in the manner described previously the respect to FIGS. 1 and 2. To provide for faster lubrication system response, microcomputer 220 (FIG. 5) utilizes the output signals from each of thrust sensor pairs 137a and 137b to sense variations in radial and axial thrust, respectively, which in practice, precedes changes in spindle bearing temperature. By anticipating changes in spindle bearing temperature prior to their occurrence, microcomputer 220 is better able to regulate spindle bearing lubrication.

As is further described in co-pending U.S. Pat. No. 4,421,443, spindle 110 has a pair of tool gripping collets 140a and 140b, which are each integrated to a separate one of the spindle ends, respectively. Each of tool gripping collets 140a and 140b, respectively, is urged radially inward to grip shank 112 of the cutting tool by a separate one of collet nuts 142a and 142b which are each in threaded engagement with spindle 110 adjacent to a separate one of collets 140a and 140b. To prevent the collet nut at each end of the spindle from loosening during high speed rotation of spindle 110, the spindle carries a pair of hollow bore collet nut drivers 145a and 145b, the collet nut drivers each being carried on the spindle adjacent to a separate one of the spindle ends so as to be coaxial with, and adjacent to, a separate one of collet nuts 142a and 142b, respectively. The bore through each collet nut driver is dimensioned to receive a respective one of the collet nuts. The interior surface of the bore through each collet nut driver, such as collet nut driver 145a, for example, carries a set of splines 146a, which splines are complementary to the exterior splines 146b carried on the rearward end of each of the collet nuts, such as collet nut 142a, and are complementary to the exterior splines 146c carried on each end of spindle 110 adjacent to a separate one of collets 140a and 140b. Each collet nut driver, such as collet nut driver 145a is slidable along the spindle between a first or inward most position at which location the collet nut driver is adjacent to an associated one of bearing caps 132 and 160, respectively, and a second or outward most position at which location the collet nut driver is distal from the corresponding bearing cap. When the collet nut driver is displaced along the spindle to its first or inwardmost position adjacent to its corresponding bearing cap, the splines on the interior surface of the collet nut driver engage the exterior splines on both the collet nut and the spindle, thus preventing the collet nut from rotating independently of the spindle. When the collet nut driver is slid outwardly along the spindle away from its corresponding spindle bearing cap to its second position, then the splines on the interior surface of the collet nut driver engage only the exterior splines on the collet nut thus permitting the collet nut and its associated collet nut driver to be threaded off of the corresponding collet at the end of the spindle. Each collet nut driver is restrained from axial movement, once slidably moved to its inward most position to engage both the spindle splines and the splines on the corresponding collet nut, by a pair of Vlier screws 148, only one of which is shown, the Vlier screws being threaded into the spindle to extend radially therefrom so that each engages a circumferential groove circumscribing the inner bore of a corresponding collet nut driver.

Proximity switches 150a and 150b are each mounted in a separate one of front and rear bearing caps 132 and 160, respectively, so that each switch is adjacent to a separate one of front and rear collet nut drivers 145a and 145b, respectively. Each of proximity switches 150a and 150b, respectively, is actuated when a separate one of collet nut drivers 145a and 145b, respectively, is slidably moved inwardly to be adjacent to a separate one of bearing caps 132 and 160, respectively, to jointly engage a separate one of collet nuts 142a and 142b, respectively, with the spindle. When actuated, each proximity switch supplies microcomputer 220 with a signal indicative of the engagement of the corresponding collet nut and the spindle. Should one of collet nut drivers 145a and 145b be slidably moved outwardly causing a corresponding one of proximity switches 150a and 150b, respectively, to cease being actuated, then microcomputer 220 supplies an inhibit signal to the drive amplifier controlling motor 114 to prevent spindle rotation. In this manner, damage to the cutting tool as well as the machine tool operator is prevented when the cutting tool is not firmly held in the spindle.

The foregoing describes a control apparatus for rotating machinery for regulating the percentage volume of oil in the oil-air lubrication mist mixture in accordance with machinery bearing temperature. By regulating the percentage volume of oil in the oil-air lubrication mist mixture in accordance with bearing temperature, proper bearing lubrication is assured, thereby lengthening bearing life.

Although the illustrative embodiment of the invention has been described in considerable detail for the purpose of disclosing a practical operative structure incorporating the invention, it is to be understood that the particular apparatus shown and described is intended to be illustrative only and various novel features of the invention may be incorporated in other structural forms without departing from the spirit and scope of the invention as defined in the subjoined claims.

The principles of this invention having now been fully explained in connection with the foregoing, we hereby claim as our invention:

1. In a lubricating system for lubricating a mechanism with an air and lubricant mist mixture, sensing means for mounting in a position to sense the temperature of the mechanism to be lubricated and to continuously produce a signal representing the sensed temperature, a source of pressurized lubricant, a source of pressurized air, an atomizer for applying said mist mixture to said mechanism connected to receive lubricant from said lubricant source from a first line and connected to receive air from said air source from a second line, a lubricant valve in said first line, an air valve in said second line, said valves controllable to enable the percent volume of lubricant in said mist mixture to vary over a range of percentages, and an automatic and continuous control means for controlling the lubricating of the mechanism by determining from said sensing means signal the proper percent volume of lubricant in said mist mixture necessary to maintain said mechanism at a minimum temperature and adjusting said lubricant and air valves to achieve said proper percent volume of lubricant in said mist mixture.

2. A lubricating system acording to claim 1 wherein said control means includes a computer.

* * * * *